US 6,674,612 B2

(12) United States Patent
Boutaghou et al.

(10) Patent No.: US 6,674,612 B2
(45) Date of Patent: Jan. 6, 2004

(54) MAGNETIC TRANSDUCING SLIDER WITH LEADING EDGE CROSSBAR

(75) Inventors: Zine-Eddine Boutaghou, Vadnais Heights, MN (US); Anthony P. Sannino, Longmont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/005,670

(22) Filed: Nov. 2, 2001

(65) Prior Publication Data

US 2002/0075598 A1 Jun. 20, 2002

Related U.S. Application Data

(60) Provisional application No. 60/245,038, filed on Nov. 2, 2000.

(51) Int. Cl.[7] .................................................. G11B 5/60
(52) U.S. Cl. .................................. 360/236.4; 360/235.6
(58) Field of Search ............................ 360/235.6, 236, 360/236.4, 235.5, 235.8, 236.3, 236.6, 235.4, 237

(56) References Cited

U.S. PATENT DOCUMENTS

| 5,062,021 A | 10/1991 | Ranjan et al. ............... 360/135 |
| 5,231,613 A | 7/1993 | Nakayama et al. ............ 369/13 |
| 5,386,400 A | 1/1995 | Nakayama et al. ............ 369/13 |
| 5,490,025 A * | 2/1996 | Dorius et al. ............. 360/236.4 |
| 5,768,055 A | 6/1998 | Tian et al. .................... 360/103 |
| 5,774,303 A | 6/1998 | Teng et al. ................. 360/103 |
| 5,841,608 A | 11/1998 | Kasamatsu et al. ......... 360/103 |

OTHER PUBLICATIONS

"Stiction Free Slider for the Smooth Surface Disk", Y. Kasamatsu, et al., IEEE Transactions on Magnetics, vol. 31, No. 6, Nov. 1995, pp. 2961–2963.

* cited by examiner

Primary Examiner—Robert S. Tupper
(74) Attorney, Agent, or Firm—Larkin Hoffman Daly & Lindgren, Ltd.; Frederick W. Niebuhr

(57) ABSTRACT

A magnetic data transducing head slider is provided with a transversely extended crossbar or other barrier near the leading edge. The barrier is deposited onto the air bearing surface of the slider using photolithographic techniques that enable precise determination of the barrier dimensions and the barrier set-back from the leading edge. The barrier set-back, width and thickness can be selected to control the transducer flying height and the pitch of the slider relative to the data recording surface of a magnetic disk when the slider is aerodynamically supported relative to the disk. The barrier also acts as a shield to minimize particulate contamination.

52 Claims, 7 Drawing Sheets

MAGNETIC TRANSDUCING SLIDER WITH LEADING EDGE CROSSBAR

This application claims the benefit of Provisional Application No. 60/245,038 entitled "Protruding Step Leading Edge AAB for Increased Particle Contamination Robustness" filed Nov. 2, 2000.

BACKGROUND OF THE INVENTION

The present invention relates to magnetic data transducing head sliders of the type supported aerodynamically during operation of a disk drive, and more particularly to such sliders designed to provide sub-microinch transducer flying heights.

In magnetic data storage devices, magnetic data transducing heads are positioned in close proximity to substantially flat recording surfaces of magnetic data storage disks. Each transducing head is movable generally radially with respect to its associated disk. In higher capacity devices, the disks are rotated at high speeds to create an air cushion or air bearing that supports each transducing head at a controlled distance from its associated recording surface. The transducing heads do not contact the disk during data reading and recording operations. When the rotating disk is brought to a halt after such operations, the transducing heads come to rest against the disk, typically along a dedicated landing zone or head contact zone with a surface textured to counteract stiction.

There is an ongoing effort in the magnetic data storage industry to increase the density at which the magnetic data can be stored. One factor that limits storage density is the transducing head flying height, i.e., the distance of the transducer from the recording surface when supported by the air bearing. As discrete data storage areas are placed more closely to one another, the transducer must "fly" closer to the recording surface to distinguish between adjacent magnetic storage areas.

In recent years, head media spacing (i.e., transducer flying heights) on the order of several microinches was considered a remarkable achievement. Further progress is leading to head media spacings under a microinch, and even less than one-half of a microinch or about 12 nm.

The reduction in head media spacing has given rise to several problems which are better understood in light of traditional slider design concepts. In particular, to facilitate slider takeoff and promote its stable aerodynamic support, the slider typically was tapered near its leading edge to promote leading edge pressurization, i.e., an increase in pressure near the leading edge and between the slider and recording surface, sufficient to separate the slider from the recording surface and maintain aerodynamic support. FIG. 1 illustrates a slider 1 with a tapered leading edge 2 just ahead of a planar air bearing surface 3. The arrow indicates the direction of media travel relative to the slider, which direction is circumferential in the case of a magnetic disk. Air travels with the disk in the same direction due to frictional drag, and thus encounters the slider first at its leading edge.

As transducer flying heights were reduced, machining the leading edge tapers to the degree of accuracy required became increasingly difficult. The result was an unwanted variation in head media spacing due to variations in fabrication.

Another problem that increases as flying heights diminish is head modulation due to particulate debris contamination. Particles, even sub-micron in size, have become an increasing problem, with particle contamination causing head modulation, in some cases leading to read/write failures.

As a result, tapered or beveled leading edge designs have been supplanted in some cases by stepped designs, e.g., such as shown in FIG. 2, showing a recess 4 in a forward edge 5 of the slider 6, having a depth of 1.5 micrometers to 3.5 micrometers as measured upwardly from an air bearing surface 7. This is known as cavity level leading edge trim. The longitudinal depth, viewed horizontally in the figure, is selected to control the slider length, which has considerable impact on the flying height at sub-microinch flying height levels. Cavity level leading edge trim can be accomplished with higher precision than forming beveled or tapered leading edges, because the trim can be accomplished by photo lithography rather than machining. An additional recess 8 is formed to provide leading edge pressurization and the resulting aerodynamic lift and the maintenance of the slider. Recess 8, referred to as step level edge trim, has a depth, upwardly as viewed in the figure, ranging from 0.1 to 0.5 micrometers.

Although this design allows a more consistent fabrication of sliders within stricter tolerance levels, these sliders in use tend to capture particles which subsequently travel beneath the slider and toward the trailing edge, working their way into the wedge formed by the normal incline of the air bearing surface relative to the data recording surface of the disk.

Particle contamination is reduced in slider designs such as that illustrated in FIG. 3, in which there is no cavity level leading edge trim; only a step level leading edge trim 9 with a depth, measured upwardly form the air bearing surface 10, in the aforementioned range of 0.1–0.5 micrometers. This provides leading edge pressurization for aerodynamic lift. While reducing the tendency to capture particles, this approach foregoes the degree of control over slider length that results from cavity level leading edge trim.

Therefore, it is an object of the present invention to provide a magnetic data transducing head slider capable of developing leading edge pressurization without a leading edge taper or leading edge trim.

Another object is to provide a process for fabricating magnetic data transducing head sliders that affords improved consistency and control over head media spacing.

A further object is to provide a magnetic data transducing head slider less susceptible to contamination by particulate debris at the micron and sub-micron level.

Yet another object is to provide a process for fabricating magnetic data transducing head sliders with more consistency and control over slider length, and increased resistance to particle contamination.

SUMMARY OF THE INVENTION

To address these and other objects, there is provided a magnetic data transducing head slider. The slider includes a slider body having a substantially planar air bearing surface with a leading edge, and a trailing edge opposite the leading edge and spaced longitudinally from the leading edge. A barrier is formed over the air bearing surface, near the leading edge and spaced longitudinally from the leading edge. The barrier extends generally transversely along the air bearing surface, and protrudes outwardly from the air bearing surface by a barrier height.

The transducing head slider further includes a magnetic data transducer mounted to the slider body. The barrier height is selected to provide pressurization proximate the leading edge sufficient to aerodynamically lift and support the slider body in spaced apart relation to a magnetic data recording medium, in response to movement of the recording medium relative to the slider body in a selected direction such that an air flow generated by the moving medium encounters the slider body first at the leading edge.

Preferably the barrier also counteracts contamination by micron and sub-micron particles. More particularly, the slider body when aerodynamically supported is inclined relative to the recording surface such that the leading edge, as compared to the trailing edge, is spaced apart from the recording distance by a greater distance. For example, the trailing edge can be flying at a sub-microinch height while the leading edge height exceeds 1 micron. In this case, the barrier preferably protrudes from the air bearing surface toward the recording surface to form a gap with a gap width considerably less than the leading edge height, e.g. about one-half micron. Consequently, micron and sub-micron particles traveling between the leading edge and recording surface toward the trailing edge are encountered by the barrier and thereby prevented from traveling further toward the trailing edge. Typically the transducer is mounted near or along the trailing edge, with the barrier thus protecting the transducer from the particles.

The barrier can comprise a substantially continuous crossbar, elongate in the transverse direction. Alternatively, the barrier can include a plurality of features protruding outwardly from the air bearing surface, with adjacent features being spaced apart from one another, preferably by less than the gap width, e.g. about 0.5 microns. In this manner, air can be permitted to flow through the barrier with minimal impact on the capacity to reduce particle contamination.

Preferably the barrier protrudes from the air bearing surface by a barrier height that is substantially uniform over the entire barrier length. The barrier height ranges from about 10 nm to about 200 nm, and more preferably is in the range of about 75–100 nm. Increasing the barrier height while keeping other parameters constant has been found to increase the pitch, i.e., the angle at which the air bearing surface is inclined relative to the recording surface. Increasing the barrier height also tends to reduce the flying height of the trailing edge. Increasing the barrier width while maintaining its length, and increasing the barrier set-back from the leading edge, tend to increase the pitch angle.

Another aspect of the present invention is a magnetic data transducing device. The device includes a slider body having a substantially planar slider surface with a leading edge and a trailing edge opposite the leading edge. The slider body is adapted to be supported with respect to a magnetic data recording medium in a data transducing position with the slider surface inclined relative to a substantially planar recording surface of the recording medium, with the leading edge spaced apart from the recording surface by a first distance and with the trailing edge spaced apart from the recording surface by a second distance less than the first distance. A magnetic data transducer is mounted to the slider body. A shield is fixed to the slider body along the slider surface, disposed between the leading edge and the transducer. The shield protrudes outwardly from the slider surface, thereby extending toward the recording surface to a selected spacing from the recorded surface when the slider body is in the data transducing position. The selected spacing is less than the first distance, whereby the shield is positioned to encounter particles traveling between the leading edge and recording surface toward the trailing edge, thereby to substantially prevent the particles from traveling further toward the trailing edge.

Another aspect of the present invention is a process for fabricating a magnetic data transducing head slider, including the following steps:

a. providing a ceramic slider substrate body;
b. depositing a layer of a barrier material at a substantially uniform thickness over substantially all of an air bearing surface of the ceramic substrate body;
c. applying a mask over the barrier material layer to selectively cover the barrier material layer over a selected barrier location;
d. etching the barrier material layer to remove the barrier material from the area not covered by the mask; and
e. removing the mask from the remaining portion of the barrier material layer.

The height of the barrier is controlled by the thickness of the barrier material layer or film. The location of the barrier with respect to the leading edge, the barrier length, the barrier width longitudinally of the slider body, and the character of the barrier in terms of a continuous ridge vs. spaced apart pads or islands, are controlled by selective shaping of the masking layer.

Thus in accordance with the present invention, a slider body can be configured for a desired pitch and transducer flying height without forming tapered or beveled leading edges, and without providing cavity level or step level leading edge trim. Alternatively, if cavity level leading edge trim is desired for the degree of control over slider body length it provides, such control is achieved while minimizing particle contamination. The barriers are fabricated with photolithographic processees, affording a high degree of consistency and control over pitch angle, transducer flying height and other slider functional characteristics.

In the Drawings

For a further appreciation of the above and other features and advantages, reference is made to the following detailed description and to the drawings, in which.

DETAILED DESCRIPTION OF THE PREFERRED EMBODIMENTS

Figure 4:
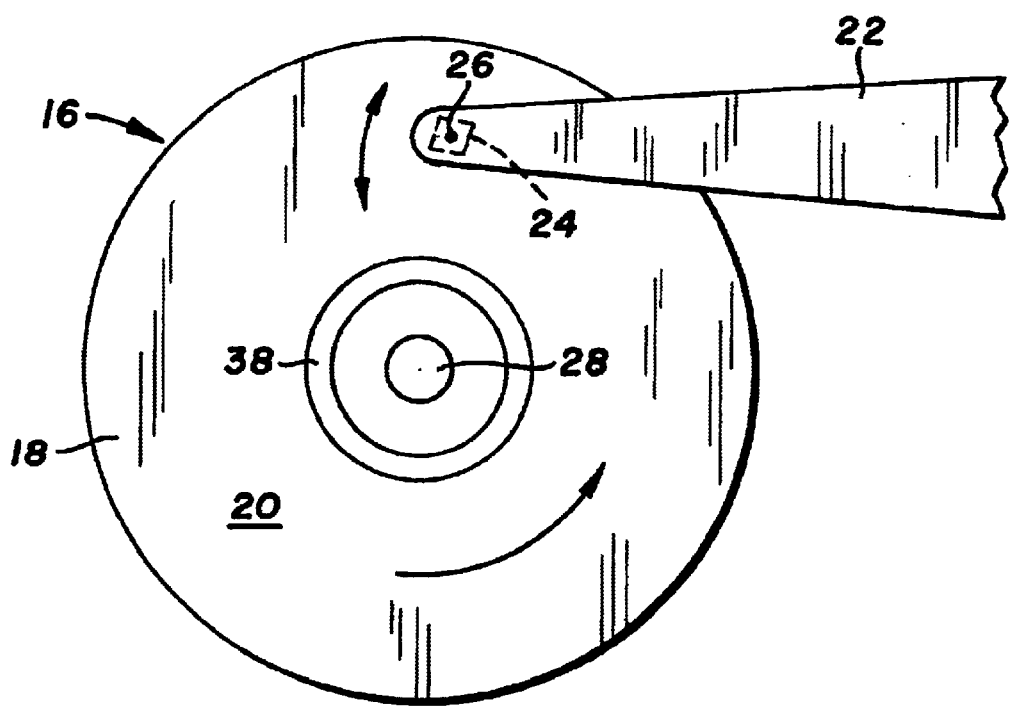
FIG. 4 is a partial schematic view of a magnetic data storage device constructed in accordance with the present invention.
Figure 5:
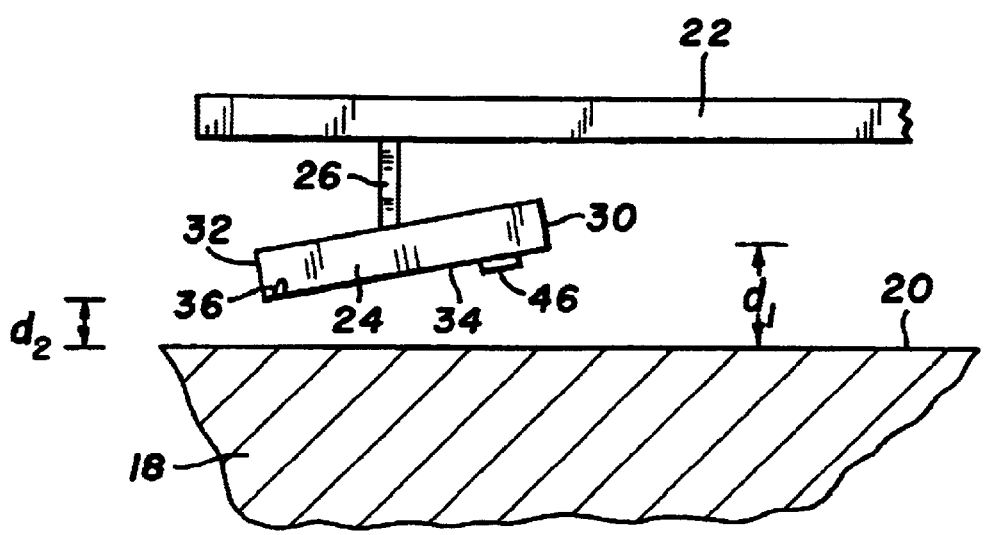
FIG. 5 is a partial elevation of the device.
Figure 6:
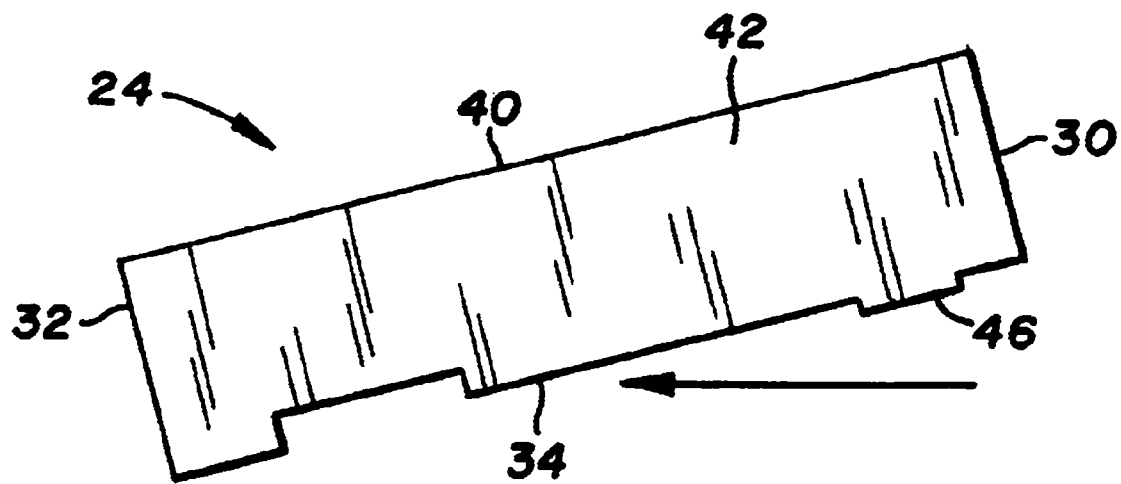
FIG. 6 is a side elevation of a magnetic data transducing head slider of the device shown in FIGS. 4 and 5.
Figure 7:
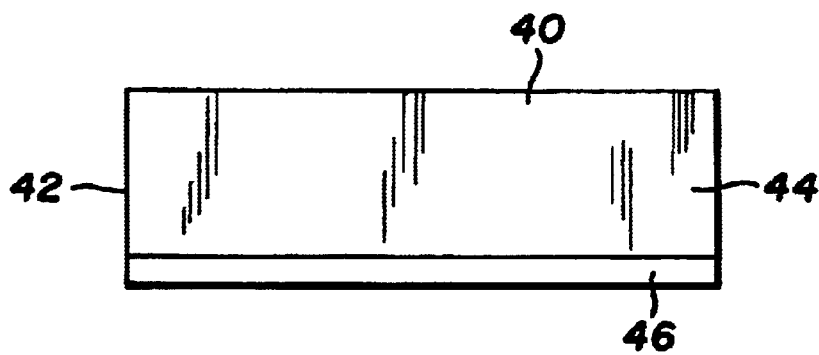
FIG. 7 is a forward end elevation of the slider.
Figure 8:
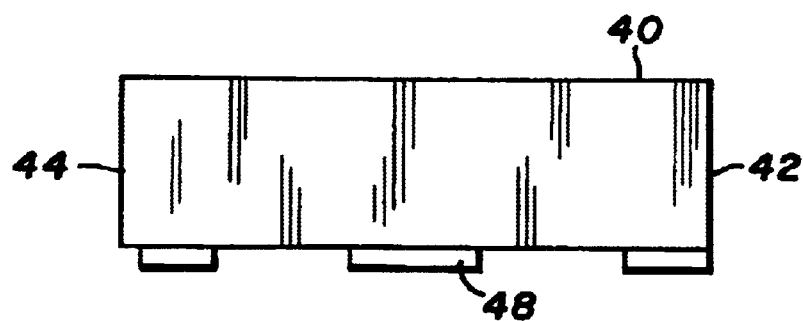
FIG. 8 is a rearward end elevation of the slider.
Figure 9:
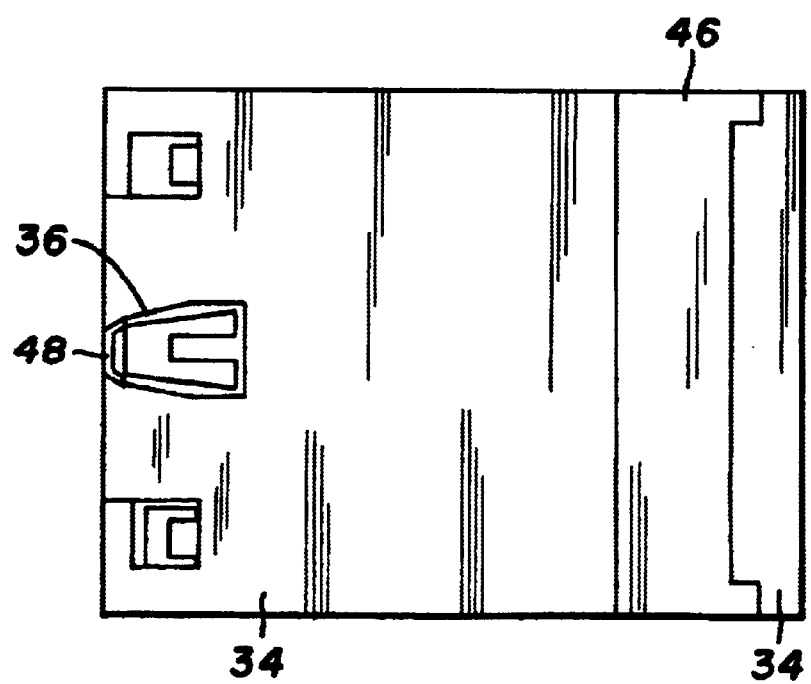
FIG. 9 is a bottom plan view of the slider.

Returning to the drawings, FIGS. 4 and 5 partially illustrate a device 16 for reading, recording and storing magnetic data on a rotatable magnetic disk 18. The disk has a substantially planar recording surface 20, shown as a horizontal surface in these figures. Surface 20 is specular, i.e. extremely smooth, with a surface roughness (distance between peak height and depression depth) of at most about 5 nm, and as low as 1–3 Angstroms. Device 16 includes a rotary actuator with a transducer support arm 22 extended in cantilevered fashion from a rotary actuator shaft (not shown). A magnetic data transducing head slider 24 is mounted to the free end of the support arm through a suspension 26. The suspension permits a gimbal ling action of the slider, i.e. limited vertical travel and limited rotation about horizontal pitch and roll axes. Arm 22, when pivoted by the rotary actuator shaft, moves slider 24 in an arcuate path, generally radially with respect to disk 18.

At its center, disk 18 has an opening to accommodate a shaft 28 of a disk drive spindle operable to rotate the disk, e.g. counterclockwise as indicated. Rotation of the disk and pivoting of support arm 22 are controlled in concert to selectively position slider 24 at desired locations along recording surface 20 for reading and recording magnetic data. During these operations, the slider does not contact disk 18, but instead is supported by an air bearing or air cushion created by disk rotation. More particularly, air near surface 20 travels with the rotating disk due to frictional drag, encountering slider 24 first at a leading edge 30, then flowing between the slider and recording surface 20 toward a trailing edge 32.

Figure 1:
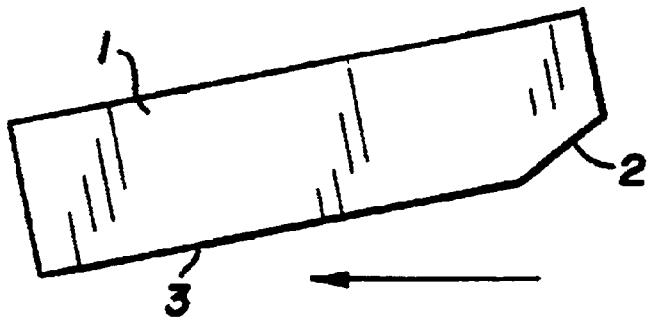
FIGS. 1–3 are profile views of prior art magnetic data transducing head sliders.
Figure 2:
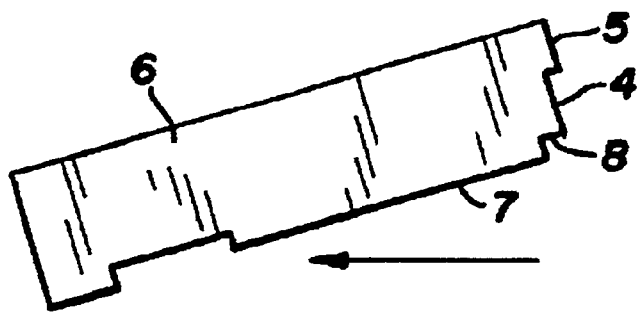

Slider 24 is formed with a smooth, planar air bearing surface 34, which is the bottom surface as viewed in FIG. 2. The air bearing, in cooperation with a downward load on the slider from support arm 22 through suspension 26, maintains the slider at a substantially constant distance above surface 20, and in a substantially constant orientation relative to the recording surface. Accordingly, a magnetic data transducer 36, carried near trailing edge 32 of the slider, is maintained at a substantially constant distance above surface 20, known as the transducer flying height or pole tip flying height, designated "h" in FIG. 2. The flying height remains substantially constant over the normal range of disk rotational speeds during reading and recording. Deceleration of disk 18 causes slider 24 to come to rest on the disk.

As best seen in FIG. 5, slider 24 during data transducing operations is oriented to incline air bearing surface 34 at a predetermined pitch angle. As a result, leading edge 30 is spaced apart from recording surface 20 by a distance $d_1$, greater than a distance $d_2$ by which trailing edge 32 is spaced apart from the recording surface. FIG. 2 exaggerates the pitch, which in actual practice is several one-hundredths of a degree. In spite of the minimal pitch, the difference between distances $d_1$ and $d_2$ is considerable. For example, assuming a slider body with a length of about 1.2 mm and a pitch angle of about 0.01 degree, and a sub-microinch transducer flying height (e.g. 10 nm), distance $d_2$ would be about 6 nm, while distance $d_1$ would be on the order of 0.05–0.1 micron, or about 50–100 nm. In some designs, distance $d_1$ may be as high as 3 microns. Thus, on a microscopic scale, air bearing surface 34 and recording surface 20 form a wedge with a forward opening sufficiently large to receive submicron particles. Given the rearward movement of disk 18 relative to the slider, particles sufficiently small to enter the gap tend to travel past the leading edge toward the trailing edge. As these particles approach the trailing edge, they may modulate the slider through contact with the slider.

To achieve low flying heights, recording surface 20 is extremely smooth as noted above. A slider that remains in contact with the smooth disk surface tends to adhere to the disk, creating a problem frequently referred to as "stiction." In addition, there are undesirable dynamic friction effects during slider takeoff and landing. To counteract these problems, an annular slider contact zone 38 is formed on the disk, typically by either mechanically texturing or laser texturing the surface to increase the surface roughness throughout the contact zone. Accordingly, any deceleration of disk 18 is accompanied by movement of support arm 22 to carry slider 24 to the contact zone before the slider comes to rest on the disk.

In accordance with the present invention, slider 24 incorporates features that ensure more consistency and control over transducer (pole tip) flying height and pitch of the slider when aerodynamically supported during data reading and recording operations.

Turning to FIGS. 6–9, transducing head slider 24 includes a substrate body formed primarily of a ceramic material, e.g. a combination of alumina (aluminum oxide, $Al_2O_3$) and titanium carbide (TiC), a substantially crystalline material. The substrate body defines the major surfaces of the slider, including air bearing surface 34, leading edge 30, trailing edge 32, a top surface 40, and two opposite side edges 42 and 44.

In this embodiment the length of the substrate body, i.e. the distance from leading edge 30 to trailing edge 32, is about 1.1 mm to 1.25 mm in the example shown. The substrate body width, from one side edge to the other, is about 1 mm. The distance between air bearing surface 34 and top surface 40 is up to about 300 microns, more particularly in the range of 175–250 microns.

Near trailing edge 32 is a transducing region of the slider, including magnetic transducer 36 substantially encapsulated in amorphous aluminum oxide, but with an exposed pole tip region 48. The distance between the pole tip region and recording surface 20 is the pole tip flying height, also called the transducer flying height.

Air bearing surface 34 is extremely smooth. A crossbar 46 is disposed near the leading edge and extends from side edge 42 to side edge 44. The bottom surface of the substrate body, which corresponds to the air bearing surface absent the crossbar, is substantially planar throughout. Leading edge 30 and trailing edge 32 are planar, and both are perpendicular to the air bearing surface. Top surface 40 is substantially parallel to the air bearing surface. Side surfaces 42 and 44 are substantially parallel to one another, both being perpendicular to the air bearing surface.

Crossbar 46 is substantially rectangular, and formed of a carbon having a high degree of hardness, known as diamond-like carbon.

Crossbar 46 provides the leading edge pressurization necessary to aerodynamically lift slider 24 away from recording surface 20, and maintain the slider in the desired data transducing position, characterized by its spaced-apart relation and pitch with respect to the recording surface. Considering the longer dimension of the slider body (leading edge to trailing edge) as longitudinal, crossbar 46 is elongate in the transverse direction, with a length substantially equal to the span from side edge 42 to side edge 44. The crossbar has a width in the longitudinal direction and a crossbar thickness in the direction outwardly away from the air bearing surface. This thickness can be conveniently thought of as a crossbar height or barrier height, notwithstanding the generally downward direction of the thickness dimension as viewed in FIGS. 6–8.

In accordance with the invention, the size and location of crossbar 46 can be selected to control the transducer flying height and slider pitch during data reading and recording operations. In particular, an increase in the crossbar height or thickness increases the pitch angle and decreases the transducer flying height. An increase in the crossbar width while maintaining the same length tends to increase the pitch angle. An increase in the crossbar set-back, i.e. the distance between leading edge 30 and the most forward edge of the crossbar, also tends to increase the pitch, so long as the crossbar is proximate the leading edge.

The dimensions and set-back of the crossbar are selected with reference to the dimensions of the slider. In connection with slider 24 (1.2 mm length and 1.0 mm width), crossbar 46 is set back from the leading edge a distance of at least 2 microns and at most about 100 microns, and more preferably in the range of about 10 microns to about 30 microns. The crossbar height can range from 10 nm to 225 nm, and more preferably is within the range of 75–100 nm. The crossbar width should be at least several microns, and may range up to about 300 microns.

Figure 10:
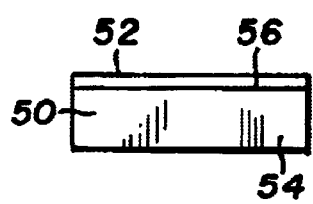
FIGS. 10–12 illustrate stages in the fabrication of the slider in accordance with the present invention.
Figure 11:
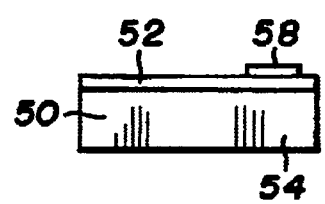
Figure 12:
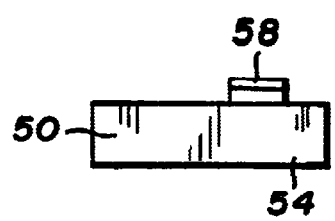

FIGS. 10–12 illustrate successive stages in one approach to fabricating a slider 50 with a crossbar or other barrier according to the present invention. FIG. 10 illustrates an initial fabrication stage in which a layer 52 of diamond-like carbon is deposited onto a substrate 54, specifically by forming a uniformly thick layer of the carbon over air bearing surface 56. Preferably an ion beam deposition process is used.

Next, as seen in FIG. 11, a reverse polarity photoresist or reverse image mask 58 is applied over layer 52, to protect the area where the crossbar is to be formed. This is followed by an etching process in which the unprotected regions of carbon layer 52 are removed. The result is shown in FIG. 12. Subsequent removal of the photoresist provides the finished crossbar, protruding outwardly from the air bearing surface by a height determined by the thickness of carbon layer 52.

Figure 13:
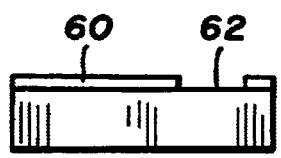
FIGS. 13 and 14 illustrate an alternative approach to fabricating the slider.
Figure 14:
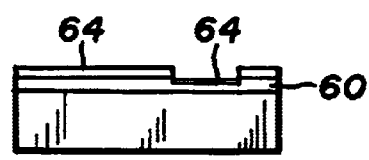

FIGS. 13 and 14 illustrate an alternative fabrication method, according to which a mask 60 is applied to the air bearing surface of the slider, leaving exposed an area 62 where the crossbar is to be formed. This is followed by deposition of the diamond-like carbon by an ion beam process or other deposition process, forming a film 64 of uniform depth, a portion of the film covering the exposed slider surface and portions of the film covering mask 60, as seen in FIG. 13. The mask is removed, leaving the completed crossbar.

In either fabrication approach, the crossbar dimensions and set-back are controlled by photolithography rather than machining. As a result, these parameters can be determined with greater precision and with a higher degree of repeatability, resulting in more predictable and more consistent slider behavior.

Figure 3:
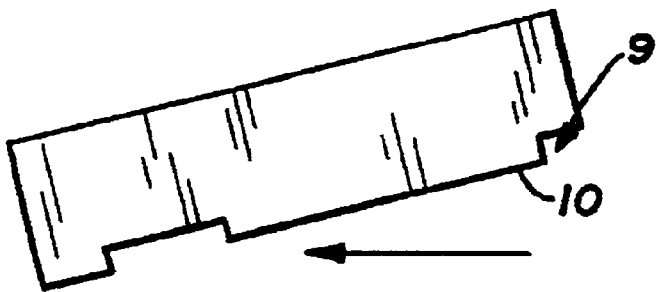

The following table compares transducer flying height, pitch, and roll for several exemplary slider designs. The flying height values are in nanometers, and the pitch and roll values are in microradians. Example 1 is a slider formed with cavity level leading edge trim and step level leading edge trim, as illustrated in FIG. 2. Example 2 is a slider formed with only step level leading edge trim, as shown in FIG. 3. Example 3 is a slider formed with a crossbar in accordance with the present invention, with a crossbar height or thickness of 27.5 nm. Example 4 is a slider formed with a crossbar having a height or thickness of 100 nm.

TABLE

|  | Flying height | Pitch | Roll |
|---|---|---|---|
| Example 1 | 10.1 | 228 | 1 |
| Example 2 | 8.7 | 199 | 0.2 |
| Example 3 | 5.2 | 74 | 7.3 |
| Example 4 | 3 | 205 | 7.1 |

The examples indicate that use of the crossbar can provide lower transducer flying heights. Depending on thickness or height, the crossbar also can lead to a reduced slider pitch. Comparison of Examples 3 and 4 indicates that reducing the crossbar height increases the transducer flying height and decreases the slider pitch. Finally, the crossbar design results in a larger roll angle, in this case a tilt about the roll (longitudinal) axis such that the radially inward side of the slider (with respect to the disk) is closer to the disk.

Figure 15:
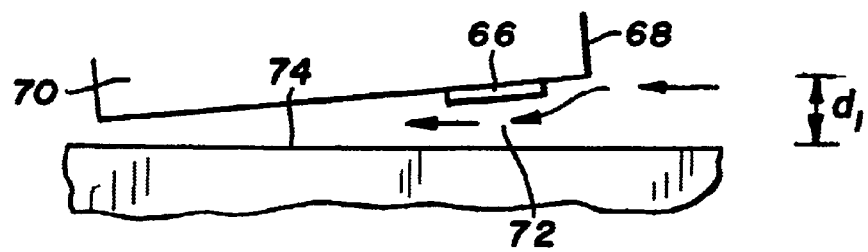
FIGS. 15 and 16 are schematic views illustrating features of the slider.

Barriers such as crossbar 46 can be configured to determine transducer flying heights and slider pitch. As illustrated schematically in FIG. 15, a crossbar 66 diverts the incoming air flow near the leading edge 68 of slider 70, forcing the air flow through a gap 72 between the outer edge of the crossbar and the recording surface. The gap is considerably narrower than distance $d_1$ between the recording surface 74 and leading edge, resulting in the localized pressure increase that aerodynamically lifts the slider. The crossbar functions as a barrier to divert an air flow that otherwise would be parallel to the air bearing surface.

Figure 16:
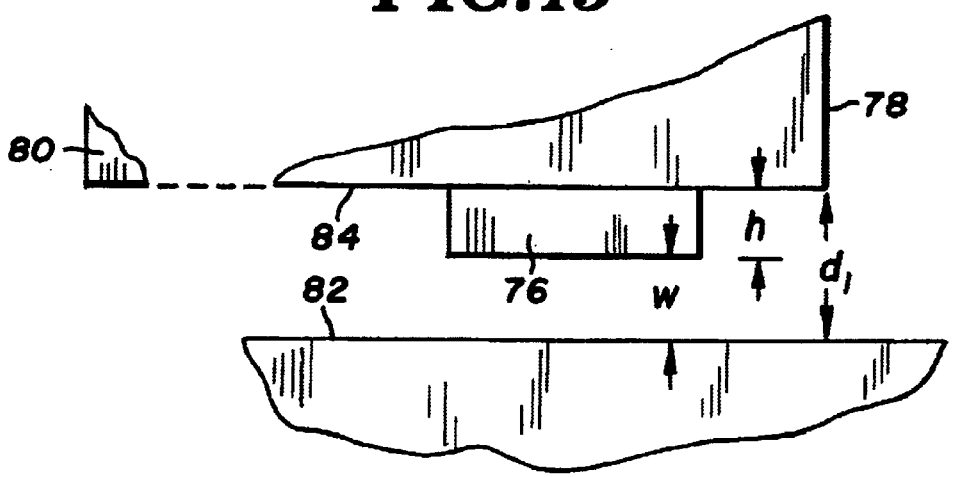

As seen from FIG. 16 when considered in view of Examples 3 and 4 above, a crossbar 76 also functions as a shield, capable of encountering micron and submicron particles that pass a leading edge 78, to prevent these particles from proceeding further toward a trailing edge 80, and through contact with the slider or diversion of the air flow, disrupting the stability of the aerodynamically supported slider. The pitch of the slider positions leading edge 78 at a distance $d_1$ above a recording surface 82. Crossbar 76 protrudes from the air bearing surface 84 to a height h. As a result, the crossbar is spaced apart from the recording surface by a gap width w. Because the pitch is an extremely small angle, the air bearing surface and recording surface can be considered parallel in determining the gap width w, which is equal to $d_1-h$. Thus, in connection with Example 4, the pitch of approximately 200 microradians yields a distance $d_1$ of about 200 nm, and the crossbar height of 100 nm yields a gap width of 100 nm. In connection with Example 3, the reduced pitch (74 microradians) yields a distance $d_1$ of about 70 nm, which with the crossbar height of 27.5 nm yields a gap width of 42.5 nm. In either event, crossbar 76 encounters the larger of the submicron particles and prevents them from traveling any further in the direction toward the trailing edge or transducer. Particles sufficiently small to pass beneath crossbar 76 are considerably less likely to have an impact on the stability of the slider.

Figure 17:
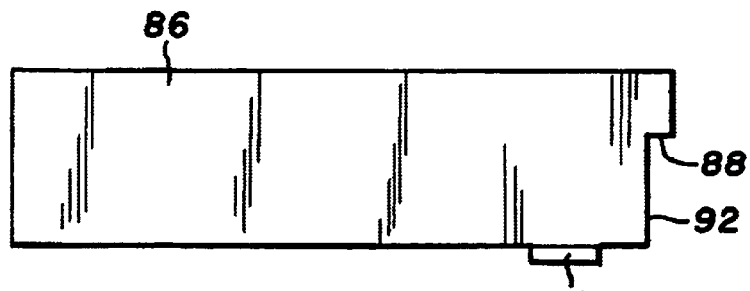
FIG. 17 is a side elevation of an alternative embodiment magnetic data transducing head slider with cavity level leading edge trim.

Because the crossbars can function as shields to collect or deflect submicron particles, sliders incorporating crossbars also can be provided with cavity level leading edge trim for more precise control over the slider body length. FIG. 17 shows a side elevation of a slider 86 having a recess 88 representing cavity level leading edge trim. A crossbar 90 is set back at least 2 microns from the recessed leading edge 92.

Figure 18:
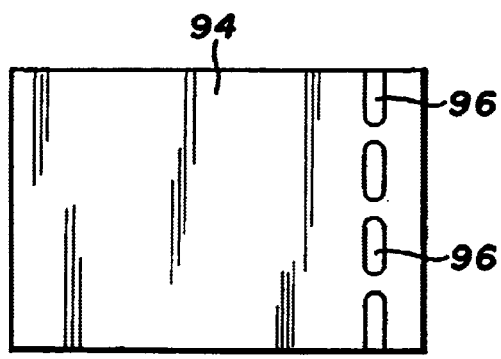
FIG. 18 is a bottom plan view of another alternative embodiment slider with a barrier consisting of spaced apart pads.

FIG. 18 is a bottom view of a slider 94 incorporating an alternative embodiment barrier in the form of a series of pads 96. The pads are elongate in the transverse direction, with adjacent pads spaced apart from one another by a transverse distance less than the length of the pads, and preferably less than gap width w (FIG. 16). Pads 96 provide substantially the same degree of protection from particle contamination as a similarly sized crossbar, but alter the air flow as compared to the crossbar because of the flow of air through the gaps between adjacent pads, and may slightly decrease the slider pitch.

Figure 19:
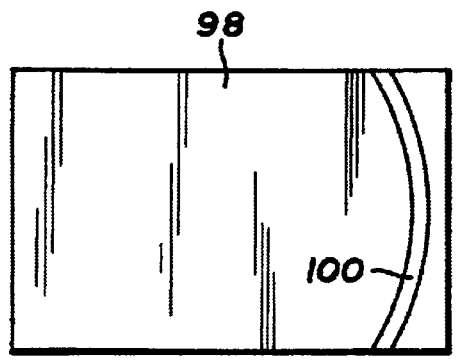
FIG. 19 is a bottom plan view of a further alternative embodiment slider with a curved barrier.

FIG. 19 illustrates a further alternative embodiment slider 98 incorporating a curved barrier 100. The curvature, although gradual, improves the capacity of the barrier to transversely deflect particles. If desired, separate pads could be formed in lieu of the single curved barrier.

Figure 20:
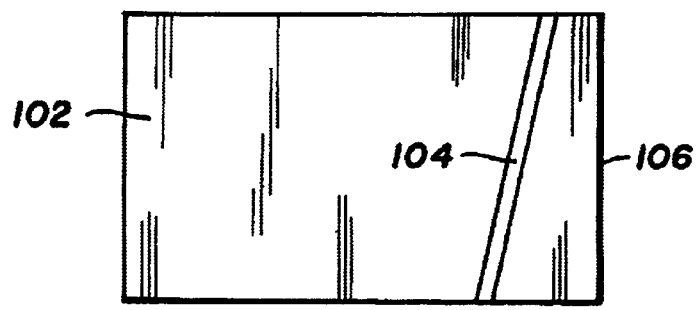
FIG. 20 is a bottom plan view of another alternative embodiment slider with an inclined barrier.

FIG. 20 illustrates another alternative slider 102 incorporating a barrier 104 that is inclined relative to a leading edge 106 of the slider. The incline, like the curvature in FIG. 19, improves the capacity of the barrier to act as a particulate shield in deflecting particles transversely away from the slider.

Figure 21:
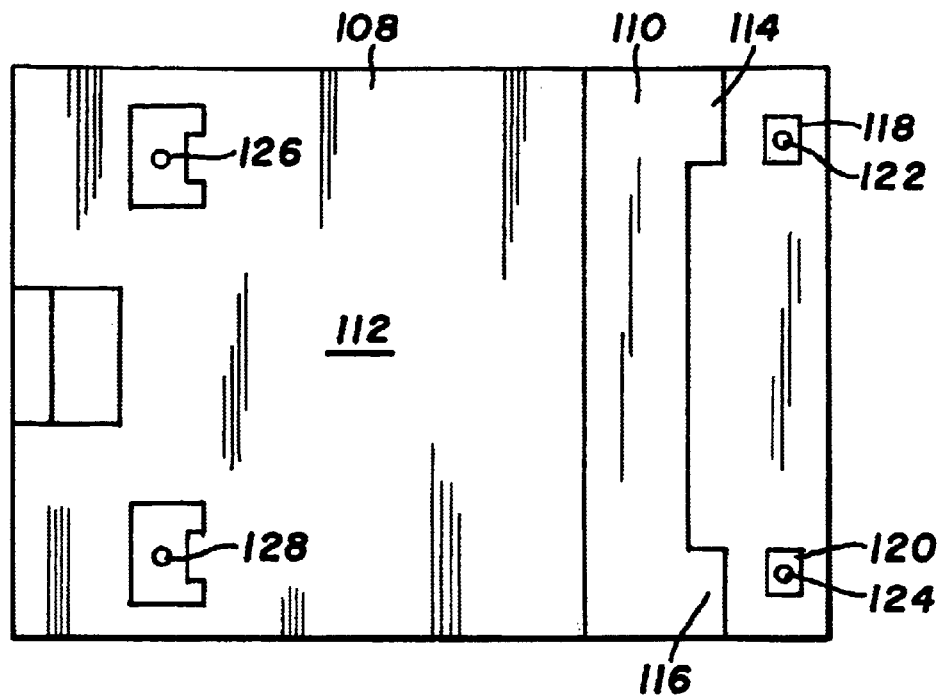
FIG. 21 is a bottom plan view of a further alternative embodiment slider.
Figure 22:
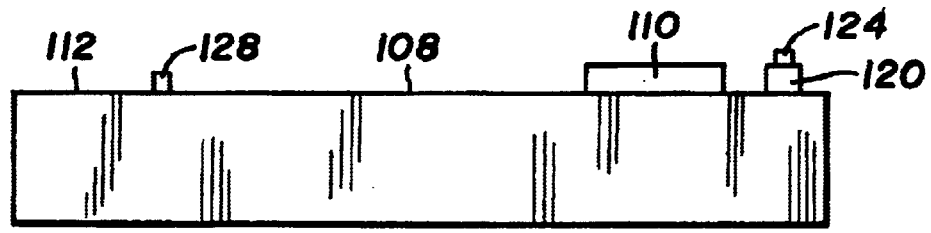
FIG. 22 is a side elevation of the slider shown in FIG. 21.

FIGS. 21 and 22 illustrate a further alternative embodiment slider 108 incorporating a barrier 110 extending lengthwise across the width of the slider air bearing surface 112. At its opposite ends, the barrier has an increased width to provide forward extensions 114 and 116.

A pair of base pads 118 and 120 are formed between the slider leading edge and forward extensions 114 and 116, respectively. Landing pads 122 and 124 are formed on base pads 118 and 120, respectively.

Further landing pads 126 and 128 are formed between barrier 110 and the trailing edge of the slider.

The landing pads are positioned to encounter the recording surface, specifically the landing zone or contact zone of the disk, when the disk is brought to a stop after reading and recording operations. Accordingly, any resulting wear occurs at the landing pads. The base pads and landing pads, like barrier 110, are formed of diamond-like carbon.

Figure 23:
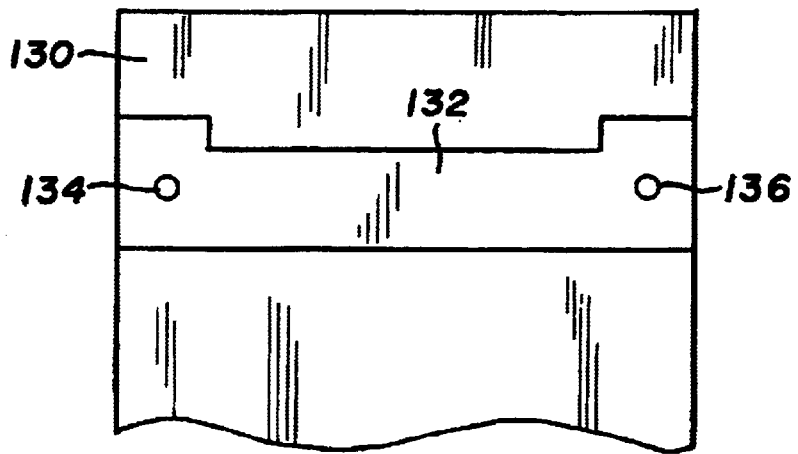
FIG. 23 is a partial bottom plan view of yet another alternative embodiment slider.

FIG. 23 illustrates the forward portion of an alternative embodiment slider 130 incorporating an elongate barrier 132. Landing pads 134 and 136 are applied directly to opposite ends of the barrier, thereby avoiding the need for separate base pads to support the landing pads. The rearward portion of slider 130 is similar to that portion of slider 108.

Thus in accordance with the present invention, crossbars or other barriers can be configured to determine the pitch and transducer flying height of a magnetic data transducing head slider. The barriers can be fabricated with a high degree of accuracy, for more predictable slider flight behavior. In addition to controlling flight orientation, the barriers act as shields to encounter and deflect submicron particles that otherwise might interfere with the stability of the aerodynamically supported slider.

The preceding detailed description is presented as a teaching regarding several embodiments of the present invention—not as a limitation upon the scope of the invention. Rather, the scope of the invention is defined by the following claims.

What is claimed is:

1. A magnetic data transducing head slider, including:
   a slider body having a substantially planar air bearing surface with a leading edge, and a trailing edge opposite and spaced longitudinally from the leading edge;
   a barrier formed over the air bearing surface, disposed proximate and spaced longitudinally from the leading edge, extending generally transversely along the air bearing surface, and protruding outwardly from the air bearing surface by a barrier height; and
   a magnetic data transducer mounted to the slider body;
   wherein the barrier is adapted to provide pressurization proximate the leading edge sufficient to aerodynamically lift and support the slider body in a data transducing position in spaced apart relation to a magnetic data recording medium when the recording medium is moving relative to the slider body in a selected direction such that an air flow generated by the moving medium encounters the slider body first at the leading edge.

2. The slider of claim 1 wherein:
   the slider body when aerodynamically supported in the data transducing position inclines the air bearing surface relative to a planar recording surface of the recording medium with the leading edge spaced apart from the recording surface by a first distance and with the trailing edge spaced apart from the recording surface by a second distance less than the first distance; and
   the barrier protrudes toward the recording surface and thereby is positioned to encounter particles traveling between the leading edge and recording surface toward the trailing edge, to substantially prevent the particles from traveling further toward the trailing edge.

3. The slider of claim 2 wherein:
   the barrier is disposed between the leading edge and the transducer, and spans substantially a transverse width of the air bearing surface.

4. The slider of claim 1 wherein:
   the barrier comprises a substantially continuous bar elongate in the transverse direction.

5. The slider of claim 4 wherein:
   the elongate bar is spaced apart longitudinally from the leading edge by a distance of at least about two microns.

6. The slider of claim 5 wherein:
   the elongate bar is spaced apart longitudinally from the leading edge by a distance of at most about 30 microns.

7. The slider of claim 1 wherein:
   the barrier height over the length of the barrier is substantially uniform.

8. The slider of claim 7 wherein:
   the barrier height is at least about ten nm.

9. The slider of claim 8 wherein:
   the barrier height is at most about 225 nm.

10. The slider of claim 6 wherein:
    the barrier has a width, substantially in the longitudinal direction, of at most about 300 microns.

11. The slider of claim 1 wherein:
    the barrier is spaced apart from the leading edge by a longitudinal distance in the range of 2–30 microns.

12. The slider of claim 1 wherein:
    the slider body includes an opposite surface spaced apart and substantially parallel to the air bearing surface, and a forward surface extending from the air bearing surface to the opposite surface and incorporating the leading edge.

13. The slider of claim 12 wherein:
    the forward surface is substantially planar and perpendicular to the air bearing surface.

14. The slider of claim 12 wherein:
    the forward surface is stepped to provide at least a first surface portion perpendicular to the air bearing surface and comprising the leading edge, and a second surface portion perpendicular to the air bearing surface and disposed forwardly of the first surface portion.

15. The slider of claim 1 wherein:
the barrier comprises a plurality of features protruding outwardly from the air bearing surface, with adjacent features being spaced apart from one another.

16. The slider of claim 15 wherein:
the features are arranged in a row substantially parallel to the leading edge.

17. The slider of claim 16 wherein:
each of the features is elongate in the direction of the row, and has a length greater than a spacing between adjacent features.

18. A magnetic data reading and recording medium including the slider defined in claim 1, and further including:
a magnetic data recording medium;
a means for rotating the recording medium about an axis; and
a means for supporting the slider in spaced apart relation to a recording surface of the magnetic data recording medium, for generally radial movement with respect to the recording medium.

19. A magnetic data transducing device, including:
a slider body having a substantially planar surface with a leading edge and a trailing edge opposite the leading edge, adapted to be supported with respect to a magnetic data recording medium in a data transducing position with the planar slider surface inclined relative to a substantially planar recording surface of the recording medium, with the leading edge spaced apart from the recording surface by a first distance and with the trailing edge spaced apart from the recording surface by a second distance less than the first distance; and
a magnetic data transducer mounted to the slider body;
wherein the improvement comprises a shield fixed to the slider body along the planar slider surface, disposed between the leading edge and the transducer, and protruding outwardly from the planar slider surface, said shield thereby extending toward the recording surface to a selected spacing from the recording surface when the slider body is in the data transducing position, the selected spacing being less than said first distance whereby the shield is positioned to encounter particles traveling between the leading edge and recording surface and toward the trailing edge, to substantially prevent the particles from traveling further toward the trailing edge, said shield comprising a plurality of features protruding outwardly from the planar slider surface, with adjacent features being space apart from one another by distances less than the selected spacing.

20. The device of claim 19 wherein:
the shield is fixed to the slider body proximate the leading edge, and the transducer is mounted to the slider body proximate the trailing edge.

21. The device of claim 20 wherein:
the slider body has a length in a longitudinal direction from the leading edge to the trailing edge, and a transverse width between two opposite side edges, and the shield substantially spans the transverse width of the slider body.

22. The device of claim 19 wherein:
the shield is spaced apart longitudinally from the leading edge by a distance of at least about two microns.

23. The device of claim 22 wherein:
the shield is spaced apart longitudinally from the leading edge by a distance of at most about 30 microns.

24. The device of claim 19 wherein:
the shield is spaced apart from the leading edge and protrudes outwardly from the planar slider surface by a shield height selected to provide a leading edge pressurization between the slider body and the recording medium near the leading edge, sufficient to provide an aerodynamic lift and support of the slider body in the data transducing position.

25. The device of claim 24 wherein:
the shield height over the length of the shield is substantially uniform.

26. The device of claim 25 wherein:
the shield height is at least about ten nm.

27. The device of claim 26 wherein:
the shield height is at most about 200 nm.

28. The device of claim 25 wherein:
the shield has a width, substantially in the longitudinal direction, of at most about 300 microns.

29. The device of claim 24 wherein:
the shield is spaced apart from the leading edge by a longitudinal distance in the range of 2–30 micrometers.

30. The device of claim 19 wherein:
the slider body includes an opposite surface substantially parallel to the planar slider surface, and a forward surface extending from the planar slider surface to the opposite surface.

31. The device of claim 30 wherein:
the forward surface is substantially planar and perpendicular to the planar slider surface.

32. The device of claim 30 wherein:
the forward surface is stepped to provide at least a first surface portion including the leading edge and perpendicular to the planar slider surface, and a second surface portion perpendicular to the planar slider surface and disposed forwardly of the first surface portion.

33. The device of claim 19 wherein:
the features are arranged in a row substantially parallel to the leading edge.

34. The device of claim 33 wherein:
each of the features is elongate in the direction of the row, and has a length greater than the selected spacing.

35. The device of claim 19 wherein:
the selected spacing is less than one-half of the first distance.

36. A magnetic data transducing device, including:
a slider body having a substantially planar surface with a leading edge and a trailing edge opposite the leading edge, adapted to be supported with respect to a magnetic data recording medium in a data transducing position with the planar slider surface inclined relative to a substantially planar recording surface of the recording medium, with the leading edge spaced apart from the recording surface by a first distance and with the trailing edge spaced apart from the recording surface by a second distance less than the first distance;
a magnetic data transducer mounted to the slider body; and
an aerodynamic lift structure integral with the slider body and adapted to provide a leading edge pressurization between the slider body and the recording medium near the leading edge when the recording medium is moving relative to the slider body in a longitudinal direction, said pressurization being sufficient to provide an aerodynamic lift and support of the slider body in the data transducing position;

wherein the aerodynamic lift structure consists essentially of a shield fixed to the slider body along the planar slider surface in longitudinally spaced apart relation to the leading edge, elongate a transverse direction, disposed between the leading edge and the transducer, and protruding outwardly from the planar slider surface, said shield thereby extending toward the recording surface to a selected spacing from the recording surface when the slider body is in the data transducing position, the selected spacing being less than said first distance whereby the shield is positioned to encounter particles between the leading edge and recording surface traveling toward the trailing edge, to substantially prevent the particles from traveling further toward the trailing edge.

37. The device of claim 36 wherein:

the shield is fixed to the slider body proximate the leading edge, and the transducer is mounted to the slider body proximate the trailing edge.

38. The device of claim 37 wherein:

the slider body has a length in a longitudinal direction from the leading edge to the trailing edge, and a transverse width between two opposite side edges, and the shield substantially spans the transverse width of the slider body.

39. The device of claim 38 wherein:

the shield comprises a substantially continuous bar elongate in the transverse direction.

40. The device of claim 39 wherein:

the bar is spaced apart longitudinally from the leading edge by a distance of at most about 30 microns.

41. The device of claim 36 wherein:

the shield height over the length of the shield is substantially uniform.

42. The device of claim 41 wherein:

the shield height is within a range of from about 10 nm to about 225 nm.

43. The device of claim 41 wherein:

the shield has a width, substantially in the longitudinal direction, of at most about 300 microns.

44. The device of claim 36 wherein:

the slider body includes an opposite surface substantially parallel to the planar slider surface, and a forward surface extending from the planar slider surface to the opposite surface.

45. The device of claim 44 wherein:

the forward surface is substantially planar and perpendicular to the planar slider surface.

46. The device of claim 44 wherein:

the forward surface is stepped to provide at least a first surface portion including the leading edge and perpendicular to the planar slider surface, and a second surface portion parallel to the first surface portion and disposed forwardly of the first surface portion.

47. The device of claim 36 wherein:

the shield comprises a plurality of features protruding outwardly from the planar slider surface, with adjacent features being spaced apart from one another by distances less than the selected spacing.

48. The device of claim 47 wherein:

the features are arranged in a row substantially parallel to the leading edge.

49. The device of claim 48 wherein:

each of the features is elongate in the direction of the row, and has a length greater than the selected spacing.

50. The device of claim 36 wherein:

the selected spacing is less than one-half of the first distance.

51. The device of claim 36 wherein:

the shield is spaced apart from the leading edge by a longitudinal distance in the range of 2–30 micrometers.

52. The device of claim 36 wherein:

the slider body over the slider surface is substantially free of non-planar features other than said aerodynamic lift structure.

* * * * *